July 12, 1960

S. ROSIN 2,944,464

ANAMORPHIC LENS SYSTEM

Filed Oct. 31, 1957

INVENTOR.
Seymour Rosin

BY Michael S. Striker
Attorney

United States Patent Office 2,944,464
Patented July 12, 1960

2,944,464

ANAMORPHIC LENS SYSTEM

Seymour Rosin, Massapequa Park, N.Y., assignor to Scanoptic, Inc., New York, N.Y.

Filed Oct. 31, 1957, Ser. No. 693,628

10 Claims. (Cl. 88—57)

The present invention relates to an anamorphic lens system, and more particularly to an anamorphic lens system constructed of cylindrical lens elements and intended for the purpose of squeezing the image of a subject into the framing proportions of a camera objective lens before the same focusses the image.

Anamorphic systems of this type are known, and it is one object of the present invention to overcome certain disadvantages of the known art, and to provide a compact anamorphic lens system capable of producing pictures of excellent quality.

It is another object of the present invention to provide an anamorphic lens system in which spherical aberration, coma, curvature of field, astigmatism, and distortion are corrected.

It is another object of the present invention to provide an anamorphic lens system in which axial and lateral color aberrations are highly corrected.

It is another object of the present invention to provide an anamorphic lens system which has a wide angular field, while the size of the foremost lens element is comparatively small.

It is a further object of the present invention to provide an anamorphic lens system which can be economically manufactured, and requires a comparatively small amount of glass.

With these objects in view, the present invention mainly consists in an anamorphic lens system which comprises a negative front member including a negative cylindrical single lens element and a cemented negative meniscus doublet rearwardly spaced a first airspace from the negative single lens element; and a positive rear member spaced a second airspace from the negative meniscus doublet and being a positive cemented doublet.

The cylindrical lens elements have all generatrices parallel, and the principal points of the front and rear members are spaced an axial distance which is the sum of the focal lengths of the negative front member and of the positive rear member when the lens system is focused for infinity.

The power of the negative meniscus doublet is substantially less than the power of the single lens element in order to minimize spreading of the rays. The outer air surfaces of the negative meniscus doublet are concave to the rear and toward the positive rear member so that the chief rays are substantially normal to the outer air surfaces of the negative meniscus doublet whereby aberrations are minimized. For the same reason, the first airspace between the negative single element and the negative meniscus doublet is at least five percent and less than 25 percent of the focal length of the negative front member.

The negative and positive doublets have cemented interfaces, and the change of the index of refraction across the interfaces, and particularly across the interface of the positive doublet is extremely small to minimize higher order aberrations including zonal and spherical aberrations, and sphero-chromatism.

The positive rear member is under-corrected for spherical aberration so as to balance a corresponding over-correction of the negative front member whereby distortion is particularly well controlled.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
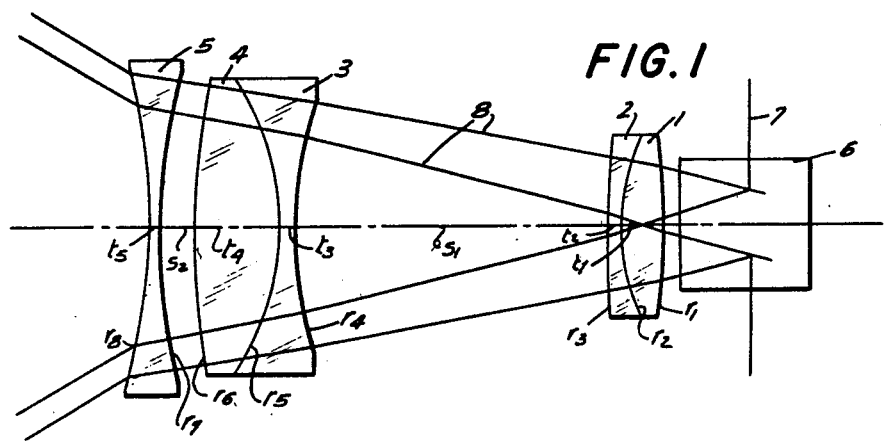
Fig. 1 is a plan view of an anamorphic lens system according to the present invention shown placed before a camera objective lens.

Referring now to the drawing, the anamorphic lens system comprises a positive rear member which is a positive cemented biconvex doublet including a rearwardly located positive cylindrical lens element 1, and a forwardly located negative cylindrical lens element 2. The rearwardly facing outer air surface of the lens element 1 is convex to the rear, and the forwardly facing outer air surface of the lens element 2 is concave to the rear. The interface between the lens elements 1 and 2 is cemented and concave to the rear. The radii of the outer air surfaces are $r_1$ and $r_3$, respectively, and the radius of the cemented interface is $r_2$. The thickness of the lens element 1 is $t_1$ and the thickness of the lens element 2 is $t_2$. The positive rear member has a focal length $f_p$.

The positive rear member 1, 2 is spaced an airspace $S_1$ from the negative front member which includes the lens elements 3, 4, and 5. Lens elements 3 and 4 are cemented to each other and form a negative meniscus doublet having outer air surfaces concave to the rear. The outer air surface of the lens element 3 has the radius $r_4$, and the outer air surface of the lens element 4 has the radius $r_6$. The cemented interface has the radius $r_5$. The lens element 3 is negative and has a thickness $t_3$, and the lens element 4 is positive and has a thickness $t_4$.

The negative front member also includes a negative single lens element 5 having a thickness $t_5$ and being spaced from the doublet 3, 4 an airspace $S_2$. The outer air surfaces of the singlet 5 have radii of curvature $r_7$ and $r_8$ respectively. The focal length of the negative front member 3, 4, 5 is $f_n$.

The negative front member, and more particularly the negative doublet 3, 4, is spaced from the positive doublet 1, 2 an airspace $S_1$. The length of the airspace $S_1$ is determined by the fact that the principal points of the rear member 1, 2 and of the front member 3, 4, 5 are spaced an axial distance which is the sum of the focal lengths $f_n$ and $f_p$ of the front and rear members when focussed at infinity.

Figure 2:
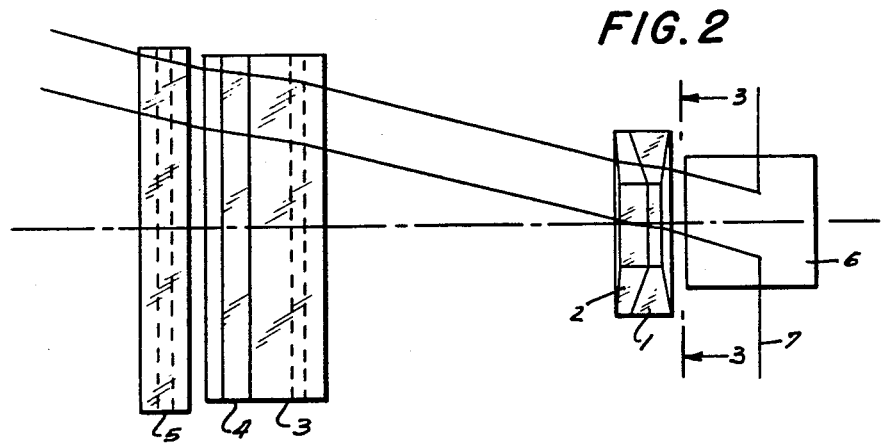
Fig. 2 is a side view of the arrangement shown in Fig. 1.

All lens elements 1, 2, 3, 4, and 5 are cylindrical and have parallel generatrices as clearly shown in Figs. 1 and 2. The lens elements 3, 4, 5 are substantially rectangular, whereas the lens elements 1, 2 are octagonal.

The entire anamorphic lens system is placed in front of a camera objective lens 6 which is associated with a diaphragm 7 having an aperture. Rays 8 are illustrated to show that rays entering at an angle of 80° will pass through the aperture of the diaphragm 7.

In accordance with the present invention, the radius of curvature $r_1$ of the lens element 1 is not greater than the focal length $fp$ of the doublet 1, 2 and not smaller than two thirds of the focal length $fp$ which may be mathematically expressed as follows:

(1) $\qquad fp \geqq r_1 \geqq \tfrac{2}{3} fp$

The radius of curvature $r_3$ is not greater than three times the focal length $fp$ and not smaller than two times the focal length $fp$ of the doublet 1, 2. This may be mathematically expressed as follows:

(2) $\qquad -3fp \geqq r_3 \geqq -2fp$

Figure 4:
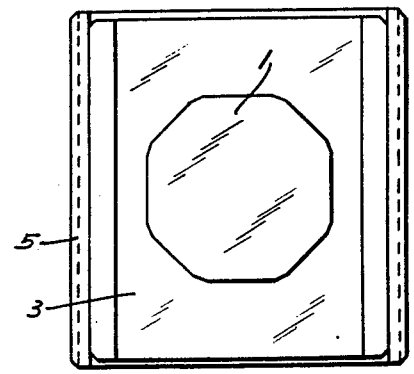
Fig. 4 is a plan view of a modified rear member.

The radius of curvature $r_2$ of the cemented interface is determined by $r_1$ and $r_3$ and by the need for color correction. Figs. 1 and 2 show the rearwardly located lens element 1 to be positive, and the forwardly located lens element 2 to be negative. As shown in Fig. 4, this arrangement can be reversed so that lens element 1 is negative and lens element 2 is positive. The ranges of $r_1$ and $r_3$ are valid for the reversed arrangement of the positive doublet 1, 2 and $r_2'$ is determined by the need for color correction.

(3) $\qquad fp \geqq r_1 \geqq \tfrac{2}{3} fp$ (3') $\qquad -3fp \geqq r_3 \geqq -2fp$ wherein $r_1$ and $r_3$ are the radii of the outer air surfaces of the negative lens element 1 and of the positive lens element 2, respectively.

It is important that the change of the index of refraction across the cement interface between the lens elements 1 and 2 should not exceed 0.03 in order to minimize higher order aberrations including zonal and spherical aberrations, and sphero-chromatism.

The radius of curvature $r_4$ is between two thirds and four thirds of the focal length $fn$, and the radius of curvature $r_6$ is between five thirds and eight thirds of the focal length $fn$ of the negative front member 3, 4, 5 which may be mathematically expressed as follows:

(4) $\qquad \tfrac{4}{3} fn \geqq r_4 \geqq \tfrac{2}{3} fn$ (5) $\qquad \tfrac{8}{3} fn \geqq r_6 \geqq \tfrac{5}{3} fn$ The radius of curvature $r_5$ of the cemented interface is determined similar to the radius $r_2$ in view of the need for color correction. The change of the index of refraction across the interface between the lens elements 3 and 4 should not exceed 0.06.

The radii of curvature $r_7$ and $r_8$ of the single lens element 5 should not be greater than 2.5 times the focal length $fn$ of the front member 3, 4, 5 which may be mathematically expressed as follows:

(6) $\qquad 2.5 fn \geqq r_7$ (7) $\qquad 2.5 fn \geqq r_8$

In accordance with the present invention, the sum of the surface powers of the doublet 3, 4 does not exceed half of the sum of the surface powers of the singlet 5 so that the spreading of rays is minimized.

The following example giving the data of a preferred embodiment of the present invention is illustrative for anamorphic lens systems according to the present invention.

The focal length $fp$ of the positive rear member is 149.88 and the focal length of the negative front member is $-74.74$, which corresponds to a ratio of 2:1. The distance between the principal points of the front member and of the rear member corresponds to $fp+fn$ and is 75.14. The airspace $S_1$ is actually 60.9 due to the fact that the principal points are inside the glass. The power of the negative doublet 3, 4 is $-3.055$ diopter, and the power of the negative singlet 5 is $-9.650$ diopter. The angle of field is substantially 80°. The lens elements are constructed in accordance with the following table:

| Lens Elements | Radii | Thicknesses | $n_D$ | $v$ |
|---|---|---|---|---|
| 1 | $r_1 = +125.0$ mm. | $t_1 = 8.5$ mm. | 1.611 | 58.8 |
| 2 | $r_2 = -43.76$ mm. | $t_2 = 2.5$ mm. | 1.605 | 38.0 |
|   | $r_3 = -354.2$ mm. | $s_1 = 60.9$ mm. |   |   |
| 3 | $r_4 = -77.5$ mm. | $t_3 = 2.9$ mm. | 1.611 | 58.8 |
|   | $r_5 = +52.67$ mm. |   |   |   |
| 4 | $r_6 = -158.0$ mm. | $t_4 = 15.8$ mm. | 1.649 | 33.8 |
|   | $r_7 = -133.3$ mm. | $s_2 = 6.3$ mm. |   |   |
| 5 | $r_8 = +120.6$ mm. | $t_5 = 2.6$ mm. | 1.611 | 58.8 |

The plus and minus signs in the second column correspond to refractive surfaces which are, respectively, convex and concave to the rear.

In the arrangement in which, as shown in Fig. 4, the positive and negative elements of the positive rear doublet are reversed, the above table is modified as follows:

| Lens Elements | Radii | Thicknesses | $n_D$ | $v$ |
|---|---|---|---|---|
| 1 | $r_1 = +125.0$ mm. | $t_1 = 2.5$ mm. | 1.605 | 38.0 |
| 2 | $r_2' = +35.68$ mm. | $t_2 = 8.5$ mm. | 1.611 | 58.8 |
|   | $r_3 = -354.2$ mm. |   |   |   |

While the above example refers to an anamorphic lens system in which the ratio between the focal length of the positive rear member and the focal length of the negative front member is 2:1, the data when expressed in terms of focal length are valid for ratios of the focal length within the range from 1.5:1 to 3:1, which may be mathematically expressed as follows:

(8) $\qquad 3 \geqq \dfrac{fp}{fn} \geqq 1.5$

The table of data for the positive rear member assuming $fp$ to be 1.000 is as follows:

| Lens Elements | Radii | Thicknesses | $n_D$ | $v$ |
|---|---|---|---|---|
| 1 | $r_1 = +0.834$ | $t_1 = 0.057$ | 1.611 | 58.8 |
| 2 | $r_2 = -0.292$ | $t_2 = 0.017$ | 1.605 | 38.0 |
|   | $r_3 = -2.363$ |   |   |   |

MODIFIED REAR MEMBER

| Lens Elements | Radii | Thicknesses | $n_D$ | $v$ |
|---|---|---|---|---|
| 1 | $r_1 = +0.834$ | $t_1 = 0.017$ | 1.605 | 38.0 |
| 2 | $r_2' = +0.238$ | $t_2 = 0.057$ | 1.611 | 58.8 |
|   | $r_3 = -2.363$ |   |   |   |

The table of data for the negative front member assuming $fn$ to be 1.000 is as follows:

| Lens Elements | Radii | Thicknesses | $n_D$ | $v$ |
|---|---|---|---|---|
| 3 | $r_4 = -1.034$ | $t_3 = 0.039$ | 1.611 | 58.8 |
| 4 | $r_5 = +0.7047$ | $t_4 = 0.211$ | 1.649 | 33.8 |
|   | $r_6 = -2.114$ | $S_2 = 0.084$ |   |   |
| 5 | $r_7 = -1.784$ | $t_5 = 0.035$ | 1.611 | 58.8 |
|   | $r_8 = +1.614$ |   |   |   |

As pointed out above, the principal points of the front and rear members are spaced the distance $fn$ plus $fp$ so that the airspace between the front and rear members can be determined when suitable values for $fn$ and $fp$ are chosen.

In the above example of an anamorphic lens system according to the present invention, the negative front member is over-corrected for spherical aberration, and the positive rear member is under-corrected for spherical aberration to balance the over correction of the negative front member.

Figure 3:
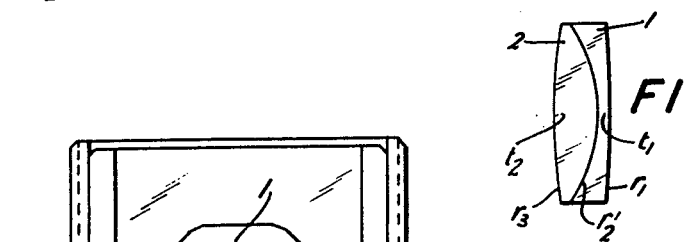
Fig. 3 is a rear view taken on line 3—3 in Fig. 2.

As best seen in Fig. 3, the positive doublet 1, 2 is octagonal and has a height and width of 36 mm. The negative doublet 3, 4 has a height of 67 mm. and a transverse width of 58 mm. The singlet 5 has a height of 71 mm. and a transverse width of 65 mm.

It will be understood that each of the elements described above, or two or more together, may also find a useful application in other types of anamorphic lens systems differing from the types described above.

While the invention has been illustrated and described as embodied in an anamorphic lens system comprising a negative singlet and a negative doublet in front, and a positive doublet in the rear, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An anamorphic lens system comprising, in combination, a negative front member including a negative cylindrical single lens element having a forwardly facing outer air face concave to the front, the absolute value of the radii of curvature of the outer airsurfaces of said single lens element being not greater than 2.5 times the focal length of said negative front member, and a cemented negative meniscus doublet rearwardly spaced a first airspace from said negative single lens element, said meniscus doublet including a forwardly located positive cylindrical lens element and a rearwardly located negative cylindrical lens element, said negative meniscus doublet having outer airsurfaces concave to the rear and a cemented interface convex to the rear, the radius of curvature of the rearwardly facing outer airsurface of said negative meniscus doublet being between two thirds and four thirds of the focal length of said negative front member, and the radius of curvature of the forwardly facing airsurface of said negative meniscus doublet being between five third and eight thirds of the focal length of said negative front member, the sum of surface powers of said negative meniscus doublet being not greater than half the sum of surface powers of said single lens element; and a positive rear member spaced a second airspace from said negative meniscus doublet and being a positive cemented doublet including a negative cylindrical lens element and a positive cylindrical lens element, said positive doublet having a rearwardly facing outer airsurface convex to the rear, the radius of curvature of said rearwardly facing outer surface being not greater than the focal length of said positive doublet and not smaller than two thirds of said focal length of said positive doublet, a forwardly facing outer airsurface concave to the rear, the absolute value of the radius of curvature of said forwardly facing outer airsurface being not greater than three times said focal length of said positive doublet and not smaller than two times said focal length of said positive doublet, and a cemented interface, said cylindrical lens elements having the generatrices thereof parallel, the principal points of said front and rear members being spaced an axial distance which is the sum of the focal lengths of said negative front member and of said positive rear member when the lens system is focused for infinity, the ratio between the focal lengths of said positive rear member and said negative front member being between 1.5:1 and 3:1.

2. An anamorphic lens system as set forth in claim 1 wherein said ratio between the focal lengths of said positive rear member and said negative front member is 2:1.

3. An anamorphic lens system comprising, in combination, a negative front member including three cylindrical lens elements and having the focal length $fn$, and a positive rear member including two cylindrical lens elements and having the focal length $fp$, the distance between the principal points of said front and rear members being $fp$ plus $fn$ when the lens system is focused for infinity, said cylindrical lens elements having the generatrices thereof all parallel, the lens system being constructed substantially according to the specifications in the following table, assuming that the focal length $fn$ is 1.000 and focal length $fp$ is 1.000:

| Lens Elements | Radii | Thicknesses | $n_D$ | $v$ |
|---|---|---|---|---|
| 1 | $r_1 = +0.834 fp$ | $t_1 = 0.057 fp$ | 1.611 | 58.8 |
| 2 | $r_2 = -0.292 fp$ | $t_2 = 0.017 fp$ | 1.605 | 38.0 |
|   | $r_3 = -2.363 fp$ | $S_1 = 0.81 \, (fp+fn)$ | | |
|   | $r_4 = -1.034 fn$ | | | |
| 3 |   | $t_3 = 0.039 fn$ | 1.611 | 58.8 |
| 4 | $r_5 = +0.7047 fn$ | $t_4 = 0.211 fn$ | 1.649 | 33.8 |
|   | $r_6 = -2.114 fn$ | $S_2 = 0.084 fn$ | | |
|   | $r_7 = -1.784 fn$ | | | |
| 5 | $r_8 = +1.614 fn$ | $t_5 = 0.035 fn$ | 1.611 | 58.8 | wherein the first column lists the lens elements in order from the rear to the front; wherein $n_D$ is the index of refraction for the D-line of the spectrum, and $v$ is the dispersive index; wherein $r$, $t$ and $S$ refer, respectively, to the radii of curvature of the refractive surfaces, the axial thicknesses of the lens elements, and the axial airspaces between the lens elements, the subscripts on the characters $r$, $t$ and $S$ being numbered from the rear to the front, and the plus and minus signs in the second column corresponding to refractive surfaces which are, respectively, convex and concave to the rear.

4. An anamorphic lens system comprising, in combination, a negative front member including three cylindrical lens elements and having the focal length $fn$, and a positive rear member including two cylindrical lens elements and having the focal length $fp$, the ratio between $fp$ and $fn$ being between 1.5:1 and 3:1, the distance between the principal points of said front and rear members being $fp$ plus $fn$ when the lens system is focused for infinity, said cylindrical lens elements having the generatrices thereof all parallel, the lens system being constructed substantially according to the specifications in the following table, assuming that the focal length $fn$ is 1.000 and the focal length $fp$ is 1.000:

| Lens Elements | Radii | Thicknesses | $n_D$ | $v$ |
|---|---|---|---|---|
| 1 | $r_1 = +0.834 fp$ | $t_1 = 0.057 fp$ | 1.611 | 58.8 |
| 2 | $r_2 = -0.292 fp$ | $t_2 = 0.017 fp$ | 1.605 | 38.0 |
|   | $r_3 = -2.363 fp$ | $S_1 = 0.81 \, (fp+fn)$ | | |
|   | $r_4 = -1.034 fn$ | | | |
| 3 |   | $t_3 = 0.039 fn$ | 1.611 | 58.8 |
| 4 | $r_5 = +0.7047 fn$ | $t_4 = 0.211 fn$ | 1.649 | 33.8 |
|   | $r_6 = -2.114 fn$ | $S_2 = 0.084 fn$ | | |
|   | $r_7 = -1.784 fn$ | | | |
| 5 | $r_8 = +1.614 fn$ | $t_5 = 0.035 fn$ | 1.611 | 58.8 | wherein the first column lists the lens elements in order from the rear to the front; wherein $n_D$ is the index of refraction for the D-line of the spectrum, and $v$ is the dispersive index; wherein $r$, $t$ and $S$ refer, respectively, to the radii of curvature of the refractive surfaces, the axial thicknesses of the lens elements, and the axial airspaces between the lens elements, the subscripts on the characters $r$, $t$ and $S$ being numbered from the rear to the front, and the plus and minus signs in the second column corresponding to refractive surfaces which are, respectively, convex and concave to the rear.

5. An anamorphic lens system comprising, in combination, a negative front member including three cylindrical lens elements and having the focal length $fn$, and a positive rear member including two cylindrical lens elements and having the focal length $fp$, the ratio between $fp$ and $fn$ being substantially 2:1, the distance between the principal points of said front and rear members being $fp$ plus $fn$ when the lens system is focused for infinity, said cylindrical lens elements having the generatrices thereof all parallel, the lens system being constructed substantially according to the specifications in the following table, assuming that the focal length $fn$ is 1.000 and the focal length $fp$ is 1.000:

| Lens Elements | Radii | Thicknesses | $n_D$ | $v$ |
|---|---|---|---|---|
| 1 | $r_1 = +0.834 fp$ | $t_1 = 0.057 fp$ | 1.611 | 58.8 |
| 2 | $r_2 = -0.292 fp$ | $t_2 = 0.017 fp$ | 1.605 | 38.0 |
|   | $r_3 = -2.363 fp$ | $S_1 = 0.81\ (fp+fn)$ | | |
| 3 | $r_4 = -1.034 fn$ | $t_3 = 0.039 fn$ | 1.611 | 58.8 |
|   | $r_5 = +0.7047 fn$ | | | |
| 4 | $r_6 = -2.114 fn$ | $t_4 = 0.211 fn$ | 1.649 | 33.8 |
|   |   | $S_2 = 0.084 fn$ | | |
| 5 | $r_7 = -1.784 fn$ | $t_5 = 0.035 fn$ | 1.611 | 58.8 |
|   | $r_8 = +1.614 fn$ | | | | wherein the first column lists the lens elements in order from the rear to the front; wherein $n_D$ is the index of refraction for the D-line of the spectrum, and $v$ is the dispersive index; wherein $r$, $t$ and $S$ refer, respectively, to the radii of curvature of the refractive surfaces, the axial thicknesses of the lens elements, and the axial airspaces between the lens elements, the subscripts on the characters $r$, $t$ and $S$ being numbered from the rear to the front, and the plus and minus signs in the second column corresponding to refractive surfaces which are, respectively, convex and concave to the rear.

6. An anamorphic lens system, comprising, in combination, a negative front member including three cylindrical lens elements and having the focal length $-74.74$ mm., and a positive rear member including two cylindrical lens elements and having the focal length 149.88 mm., the distance between the principal points of said front and rear members being 75.14 mm. when the lens system is focused for infinity, said cylindrical lens elements having the generatrices thereof all parallel, the lens system being constructed substantially according to the specifications in the following table:

| Lens Elements | Radii | Thicknesses | $n_D$ | $v$ |
|---|---|---|---|---|
| 1 | $r_1 = +125.0$ mm. | $t_1 = 8.5$ mm. | 1.611 | 58.8 |
| 2 | $r_2 = -43.76$ mm. | $t_2 = 2.5$ mm. | 1.605 | 38.0 |
|   | $r_3 = -354.2$ mm. | $S_1 = 60.9$ mm. | | |
| 3 | $r_4 = -77.5$ mm. | $t_3 = 2.9$ mm. | 1.611 | 58.8 |
|   | $r_5 = +52.67$ mm. | | | |
| 4 | $r_6 = -158.0$ mm. | $t_4 = 15.8$ mm. | 1.649 | 33.8 |
|   |   | $S_2 = 6.3$ mm. | | |
| 5 | $r_7 = -133.3$ mm. | $t_5 = 2.6$ mm. | 1.611 | 58.8 |
|   | $r_8 = +120.6$ mm. | | | | wherein the first column lists the lens elements in order from the rear to the front; wherein $n_D$ is the index of refraction for the D-line of the spectrum, and $v$ is the dispersive index; wherein $r$, $t$ and $S$ refer, respectively, to the radii of curvature of the refractive surfaces, the axial thicknesses of the lens elements, and the axial airspaces between the lens elements, the subscripts on the characters $r$, $t$ and $S$ being numbered from the rear to the front, and the plus and minus signs in the second column corresponding to refractive surfaces which are, respectively, convex and concave to the rear.

7. An anamorphic lens system, comprising, in combination, a negative front member including three cylindrical lens elements and having the focal length $-74.74$ mm. and a positive rear member including two cylindrical lens elements and having the focal length 149.88 mm., the distance between the principal points of said front and rear members being 75.14 mm. when the lens system is focused for infinity, said cylindrical lens elements having the generatrices thereof all parallel, the lens system being constructed substantially according to the specifications in the following table:

| Lens Elements | Radii | Thicknesses | $n_D$ | $v$ |
|---|---|---|---|---|
| 1 | $r_1 = +125.0$ mm. | $t_1 = 2.5$ mm. | 1.605 | 38.0 |
|   | $r_2 = +35.68$ mm. | $t_2 = 8.5$ mm. | 1.611 | 58.8 |
| 2 | $r_3 = -354.2$ mm. | $S_1 = 60.9$ mm. | | |
| 3 | $r_4 = -77.5$ mm. | $t_3 = 2.9$ mm. | 1.611 | 58.8 |
|   | $r_5 = +52.67$ mm. | | | |
| 4 | $r_6 = -158.0$ mm. | $t_4 = 15.8$ mm. | 1.649 | 33.8 |
|   |   | $S_2 = 6.3$ mm. | | |
| 5 | $r_7 = -133.3$ mm. | $t_5 = 2.6$ mm. | 1.611 | 58.8 |
|   | $r_8 = +120.6$ mm. | | | | wherein the first column lists the lens elements in order from the rear to the front; wherein $n_D$ is the index of refraction for the D-line of the spectrum, and $v$ is the dispersive index; wherein $r$, $t$ and $S$ refer, respectively, to the radii of curvature of the refractive surfaces, the axial thicknesses of the lens elements, and the axial airspaces between the lens elements, the subscripts on the characters $r$, $t$ and $S$ being numbered from the rear to the front, and the plus and minus signs in the second column corresponding to refractive surfaces which are, respectively, convex and concave to the rear.

8. An anamorphic lens system comprising, in combination, a negative front member including three cylindrical lens elements and having the focal length $fn$, and a positive rear member including two cylindrical lens elements and having the focal length $fp$, the ratio between $fp$ and $fn$ being between 1.5:1 and 3:1, the distance between the principal points of said front and rear members being $fp$ plus $fn$ when the lens system is focused for infinity, said cylindrical lens elements having the generatrices thereof all parallel, the lens system being constructed substantially according to the specification in the following table, assuming that the focal length $fn$ is 1.000 and the focal length $fp$ is 1.000:

| Lens Elements | Radii | Thicknesses | $n_D$ | $v$ |
|---|---|---|---|---|
| 1 | $r_1 = +0.834 fp$ | $t_1 = 0.017 fp$ | 1.605 | 38.0 |
|   | $r_2 = +0.238 fp$ | $t_2 = 0.057 fp$ | 1.611 | 58.8 |
| 2 | $r_3 = -2.363 fp$ | $S_1 = 0.81\ (fp+fn)$ | | |
|   | $r_4 = -1.034 fn$ | | | |
| 3 | $r_5 = +0.7047 fn$ | $t_3 = 0.039 fn$ | 1.611 | 58.8 |
| 4 | $r_6 = -2.114 fn$ | $t_4 = 0.211 fn$ | 1.649 | 33.8 |
|   |   | $S_2 = 0.084 fn$ | | |
| 5 | $r_7 = -1.784 fn$ | $t_5 = 0.035 fn$ | 1.611 | 58.8 |
|   | $r_8 = +1.614 fn$ | | | | wherein the first column lists the lens elements in order from the rear to the front; wherein $n_D$ is the index of refraction for the D-line of the spectrum, and $v$ is the dispersive index; wherein $r$, $t$ and $S$ refer, respectively, to the radii of curvature of the refractive surfaces, the axial thicknesses of the lens elements, and the axial airspaces between the lens elements, the subscripts on the characters $r$, $t$ and $S$ being numbered from the rear to the front, and the plus and minus signs in the second column corresponding to refractive surfaces which are, respectively, convex and concave to the rear.

9. An anamorphic lens system comprising, in combination, a negative front member, including a negative cylindrical single lens element, having a forwardly facing outer airface concave to the front, the absolute value of the radii of curvature of the outer airsurface of said single lens element being not greater than 2.5 times the focal length of said negative front member, and a cemented negative meniscus doublet rearwardly spaced a first airspace from said negative single lens element, said meniscus doublet including a forwardly located positive cylindrical lens element and a rearwardly located negative cylindrical lens element, said negative meniscus doublet having outer airsurfaces concave to the rear and a cemented interface convex to the rear, the change of the index of refraction across said cemented interface being less than 0.06, the radius of curvature of the rearwardly facing outer airsurface of said negative meniscus doublet being between two thirds and four thirds of the focal length of said negative front member, and the radius of curvature of the forwardly facing airsurface of said negative meniscus doublet being between five thirds and eight thirds of the focal length of said negative front member, the sum of surface powers of said negative meniscus doublet being not greater than half the sum of surface powers of said single lens element; and a positive rear member spaced a second airspace from said negative meniscus doublet and being a positive cemented doublet including a negative cylindrical lens element and a positive cylindrical lens element, said positive doublet having a rearwardly facing outer airsurface convex to the rear, the radius of curvature of said rearwardly facing outer suface being not greater than the focal length of said positive doublet and not smaller than two thirds of said focal length of said positive doublet, a forwardly facing outer airsurface concave to the rear, the absolute value of the radius of curvature of said forwardly facing outer airsurface being not greater than three times said focal length of said positive doublet and not smaller than two times said focal length of said positive doublet, and a cemented interface, the change of the index of refraction across the cemented interface of said positive doublet being less than 0.03 so as to minimize higher order aberrations, said cylindrical lens elements having the generatrices thereof parallel, the principal points of said front and rear members being spaced an axial distance which is the sum of the focal lengths of said negative front member and of said positive rear member when the lens system is focused for infinity, the ratio between the focal lengths of said positive rear member and said negative front member being between 1.5:1 and 3:1.

10. An anamorphic lens system comprising, in combination, a negative front member including a negative cylindrical single lens element having a forwardly facing outer airface concave to the front, the absolute value of the radii of curvature of the outer airsurfaces of said single lens element being not greater than 2.5 times the focal length of said negative front member, and a cemented negative meniscus doublet rearwardly spaced a first airspace from said negative single lens element, said meniscus doublet including a forwardly located positive cylindrical lens element and a rearwardly located negative cylindrical lens element, said negative front member being overcorrected for spherical aberration, said negative meniscus doublet having outer airsurfaces concave to the rear and a cemented interface convex to the rear, the radius of curvature of the rearwardly facing outer airsurface of said negative meniscus doublet being between two thirds and four thirds of the focal length of said negative front member, and the radius of curvature of the forwardly facing airsurface of said negative meniscus doublet being between five thirds and eight thirds of the focal length of said negative front member, the sum of surface powers of said negative meniscus doublet being not greater than half the sum of surface powers of said single lens element; and a positive rear member spaced a second airspace from said negative meniscus doublet and being a positive cemented doublet including a negative cylindrical lens element and a positive cylindrical lens element, said positive doublet having a rearwardly facing outer airsurface convex to the rear, the radius of curvature of said rearwardly facing outer surface being not greater than the focal length of said positive doublet and not smaller than two thirds of said focal length of said positive doublet, said positive rear member being undercorrected for spherical aberration to balance the overcorrection of said negative front member, a forwardly facing outer airsurface concave to the rear, the absolute value of the radius of curvature of said forwardly facing outer airsurface being not greater than three times said focal length of said positive doublet and not smaller than two times said focal length of said positive doublet, and a cemented interface, said cylindrical lens elements having the generatrices thereof parallel, the principal points of said front and rear members being spaced an axial distance which is the sum of the focal lengths of said negative front member and of said positive rear member when the lens system is focused for infinity, the ratio between the focal lengths of said positive rear member and said negative front member being between 1.5:1 and 3:1.

References Cited in the file of this patent
UNITED STATES PATENTS

| | | |
|---|---|---|
| 1,962,892 | Chretien | June 12, 1934 |
| 2,720,813 | Cox | Oct. 18, 1955 |
| 2,721,500 | Kohler et al. | Oct. 25, 1955 |
| 2,752,821 | Cook | July 3, 1956 |